United States Patent
Jones

(10) Patent No.: US 9,239,011 B2
(45) Date of Patent: Jan. 19, 2016

(54) METHOD OF INHIBITING ICE ACCRETION WITHIN A TURBINE ENGINE AND CONTROL SYSTEM THEREFOR

(75) Inventor: Alan R. Jones, Derby (GB)

(73) Assignee: ROLLS-ROYCE plc, London (GB)

( * ) Notice: Subject to any disclaimer, the term of this patent is extended or adjusted under 35 U.S.C. 154(b) by 509 days.

(21) Appl. No.: 13/546,514

(22) Filed: Jul. 11, 2012

(65) Prior Publication Data
US 2013/0019608 A1 Jan. 24, 2013

(30) Foreign Application Priority Data

Jul. 22, 2011 (GB) .................................. 1112577.0

(51) Int. Cl.
| | |
|---|---|
| *F02C 9/42* | (2006.01) |
| *F02C 7/275* | (2006.01) |
| *B64F 5/00* | (2006.01) |
| *F02K 3/12* | (2006.01) |
| *F02C 9/28* | (2006.01) |
| *B64D 15/16* | (2006.01) |

(52) U.S. Cl.
CPC ............... *F02C 7/275* (2013.01); *B64F 5/0054* (2013.01); *F02C 9/42* (2013.01); *B64D 15/16* (2013.01); *F02C 9/28* (2013.01); *F02K 3/12* (2013.01); *F23N 2041/20* (2013.01)

(58) Field of Classification Search
CPC ........................................................ F02C 7/275
USPC .............. 60/39.091, 39.093, 779; 244/134 R
See application file for complete search history.

(56) References Cited

U.S. PATENT DOCUMENTS

| | | | | |
|---|---|---|---|---|
| 3,965,673 | A | * | 6/1976 | Friedrich .......................... 60/788 |
| 4,062,185 | A | * | 12/1977 | Snow ............................... 60/204 |
| 4,184,327 | A | * | 1/1980 | Cornett et al. ................... 60/240 |
| 4,254,619 | A | * | 3/1981 | Giffin et al. ................... 60/226.1 |
| 5,239,830 | A | * | 8/1993 | Banthin et al. ................... 60/718 |
| 2003/0126862 | A1 | * | 7/2003 | Peplow et al. .................. 60/773 |
| 2007/0267540 | A1 | * | 11/2007 | Atkey et al. ..................... 244/58 |
| 2008/0276620 | A1 | * | 11/2008 | Ullyott et al. ................... 60/773 |
| 2009/0294593 | A1 | * | 12/2009 | Jacquet-Francillon et al. ................. 244/134 R |
| 2010/0024434 | A1 | * | 2/2010 | Moore et al. ..................... 60/788 |

FOREIGN PATENT DOCUMENTS

| | | |
|---|---|---|
| EP | 1 959 114 A2 | 8/2008 |
| GB | 2 411 437 A | 8/2005 |
| WO | WO 95/02120 A1 | 1/1995 |

OTHER PUBLICATIONS

Search Report issued in British Patent Application No. 1112577.0 dated Nov. 25, 2011.

* cited by examiner

*Primary Examiner* — Gerald L Sung
*Assistant Examiner* — Scott Walthour
(74) *Attorney, Agent, or Firm* — Oliff PLC

(57) ABSTRACT

A method of inhibiting ice accretion within a turbine engine, including the steps: (a) operating the turbine engine at a predetermined engine speed; and (b) driving the compressor of the turbine engine at an elevated speed which is greater than the nominal speed of the compressor at the predetermined engine speed so as to inhibit ice accretion within the compressor.

7 Claims, 1 Drawing Sheet

METHOD OF INHIBITING ICE ACCRETION WITHIN A TURBINE ENGINE AND CONTROL SYSTEM THEREFOR

TECHNICAL FIELD

This invention relates to a method of, and a control system for, inhibiting ice accretion within a turbine engine, and is particularly, although not exclusively concerned with inhibiting ice accretion within a compressor of a turbine engine.

BACKGROUND

Ice accretion is a problem which is known to affect aircraft gas turbine engines during flight. Ice crystals which form at high altitudes are drawn into the aircraft engines and are deposited on internal components, in particular compressor components, of the engines. When the engine thrust is relatively high, for example during climb and cruise conditions, the temperature within the engine and the high velocity airflow through the engine prevent ice crystals from accumulating within the compressor. However, when the engine thrust is low, for example during descent of the aircraft, the combination of low temperatures and low velocity air allows ice to build up to significant thicknesses on the compressor components.

Ice shedding occurs when there is a subsequent increase in the temperature of the engine, for example as a consequence of an increase in engine power at the end of the descent phase, or because of an increase in the ambient air temperature as the aircraft descends. In addition, ice shedding may occur simply because the amount of ice accretion reaches a point at which the drag acting on the accreted ice exceeds the strength of its adhesion to the components.

Shed ice passes through the engine which can cause damage to downstream engine components.

All engines on a multi-engine aircraft are generally subjected to the common weather conditions at some point in operation. Therefore, ice crystal accretion and subsequent shedding is recognised as "common mode" threat which can potentially affect all engines of the aircraft simultaneously. A common mode threat reduces the inherent redundancy and hence increased safety associated with multiple engined aircraft.

It is normal practice for a pilot to increase the speed of an engine intermittently during descent in order to raise the temperature of the engine thereby preventing substantial ice crystal accretion. Increasing the speed of the engine has two disadvantages. Firstly, the thrust will increase beyond that required by the aircraft to descend, making descent times longer. Secondly, it causes more fuel to be burnt during descent.

Alternatively, or in addition, components of the engine which are vulnerable to damage by shed ice are strengthened to avoid catastrophic damage. Strengthening engine components creates an increase in weight of the engine or an increase in drag, thus reducing engine efficiency and increasing the rate of fuel consumption.

BRIEF SUMMARY OF THE INVENTION

According to a first aspect of the present invention there is provided a method of inhibiting ice accretion within a turbine engine having a fan and a compressor stage wherein the fan stage provides the majority of the thrust of the engine, the method comprising the steps:

(a) operating the fan at a predetermined rotational velocity; and (b) driving the compressor stage of the turbine engine at an elevated rotational velocity which is greater than the nominal rotational velocity of the compressor stage at the predetermined fan rotational velocity so as to inhibit ice accretion within the compressor.

The predetermined fan rotational velocity may be the rotational velocity at which negligible thrust is generated by the turbine engine.

Preferably the compressor of the turbine engine is driven at the elevated rotational velocity by an external power supply.

The turbine engine may be a receiving turbine engine and the power supply is a donating turbine engine.

The fan of the donating turbine engine may be operated at substantially the same rotational velocity as the fan of the receiving turbine engine while driving the compressor of the receiving turbine engine at the elevated rotational velocity.

Preferably the donating turbine engine is operated such that the compressor of the receiving turbine engine is at an elevated temperature at which ice accretion within the compressor of the receiving turbine engine is inhibited.

During step (b) fuel flow to the turbine engine may be interrupted.

Preferably the turbine engine is mounted on an aircraft, wherein step (a) comprises the step of reducing the operating rotational velocity of the fan of the turbine engine to the predetermined rotational velocity to begin descent of the aircraft.

According to a second aspect there is provided a control system for performing a method as claimed in any one of the preceding claims in an aircraft comprising:
a turbine engine for propelling an aircraft;
a power supply; and
a transmission coupling the power supply with a compressor of the turbine engine, the control system being configured to drive the compressor from the power supply via the transmission at an elevated rotational velocity which is greater than a nominal rotational velocity of the compressor at an operating rotational velocity of fan of the turbine engine.

The control system may be configured to drive the compressor via an electrical transmission.

The control system may be configured to drive the compressor from a donating turbine engine, the donating turbine engine being an engine for propelling the aircraft.

Preferably the control system is configured to drive the compressor from an auxiliary power unit onboard the aircraft.

According to a third aspect of the invention there is provided a control system wherein the turbine engine is one of multiple turbine engines for propelling the aircraft, the control system being configured to drive a compressor of each of the turbine engines at an elevated rotational velocity which is greater than a nominal rotational velocity of the compressor at an operating rotational velocity of the fan of the respective turbine engines.

According to a fourth aspect of the invention there is provided a method of inhibiting ice accretion within a turbine engine, comprising the steps:

(a) operating the turbine engine at a predetermined fan rotational velocity; and (b) driving a load with the turbine engine while maintaining the predetermined fan rotational velocity such that the temperature of the compressor of the turbine engine is at an elevated temperature which is greater than the nominal temperature of the compressor at the predetermined fan rotational velocity so as to inhibit ice accretion within the compressor.

According to a fifth aspect of the invention there is provided a control system in an aircraft comprising:
a turbine engine for propelling an aircraft;
a load; and
a transmission coupling the turbine engine with the load, the control system being configured to drive the load from the turbine engine via the transmission such that the temperature of a compressor of the turbine engine is at an elevated temperature which is not less than a nominal temperature of the compressor at an operating rotational velocity of the fan of the turbine engine.

DETAILED DESCRIPTION OF THE INVENTION

For a better understanding of the present invention, and to show more clearly how it may be carried into effect, reference will now be made, by way of example, to the accompanying drawings, in which:-

Figure 1:
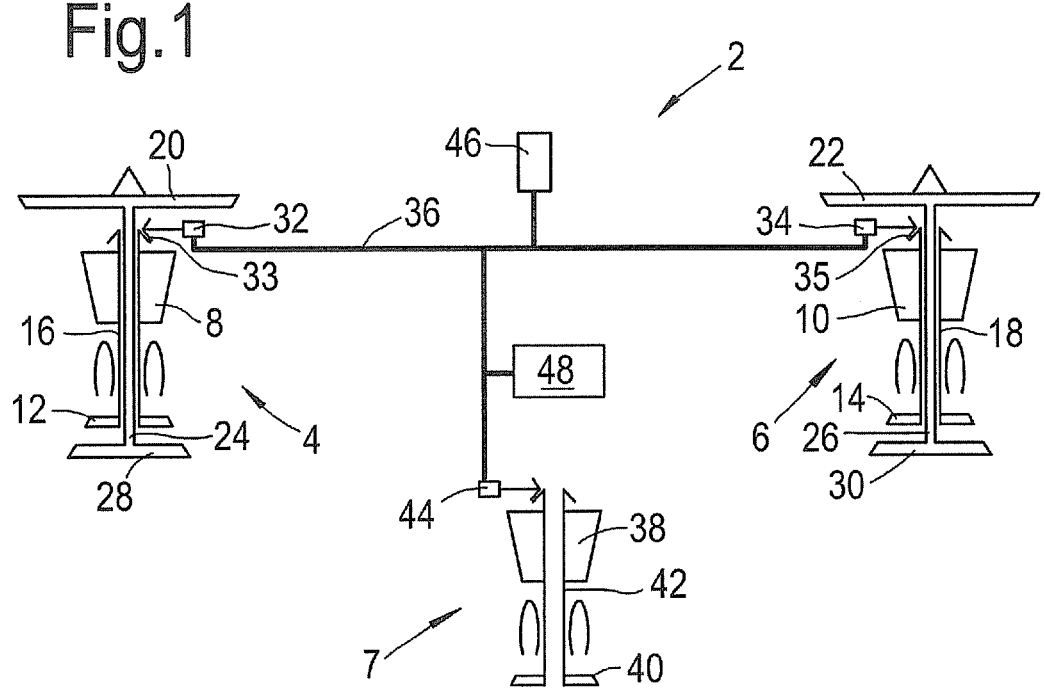
FIG. 1 is a schematic representation of a propulsion system of an aircraft according to an embodiment of the present invention.

FIG. 1 is a schematic representation of a propulsion system 2 of an aircraft (not shown), which comprises a first turbine engine 4, a second turbine engine 6 and an auxiliary power unit 7.

Each engine 4, 6 comprises a core compressor 8, 10 and a core turbine 12, 14. The compressor 8, 10 and core turbine 12, 14 of each engine are connected by respective core driveshafts 16, 18. Both engines 4, 6 provide propulsion for the aircraft during flight. In the embodiment shown, each engine 4, 6 is a turbofan engine and so further comprises a fan 20, 22 which is connected by a driveshaft 24, 26 to a respective low-pressure turbine 28, 30. The driveshafts 24, 26 extend along respective hollow central portions of the core driveshafts 16, 18. The core driveshafts 16, 18 rotate independently of the driveshafts 24, 26.

Each core drive shaft 16, 18 is connected to a respective electrical generator-motor 32, 34, for example by a gear train 33, 35, such that the generator-motors 32, 34 can be used to convert the mechanical rotation of each core driveshaft 16, 18 into electrical energy or can be used to convert electrical energy into mechanical rotation of each core driveshaft 16, 18.

The generator-motors 32, 34 are coupled by an electrical transmission 36 so that electrical energy generated by one of the generator-motors 32, 34 can be used to drive the other.

The auxiliary power unit 7 is in the form of a turbine engine for generating electrical power onboard the aircraft. The auxiliary power unit 7 does not contribute significantly to the propulsion of the aircraft during flight. The auxiliary power unit 7 comprises a core compressor 38 and a turbine 40 which are connected by a core driveshaft 42. The driveshaft 42 is connected to a generator-motor 44 which is coupled to the generator-motors 32, 34 of the first and second turbine engines 4, 6 by the electrical transmission 36.

The generator-motors 32, 34, 44 and electrical transmission 36 together comprise a transmission which couples the respective core driveshafts 16, 18, 42 of the turbine engines 4, 6 and the auxiliary power unit 7 together. Electrical power generated by rotation of each the core driveshafts 16, 18, 42 can therefore be transferred via the transmission to one or more of the other core driveshafts 16, 18, 42.

A flight control system 46 is connected to the electrical transmission 36. The flight control system 46 controls distribution of electrical power generated by the turbine engines 4, 6 and the auxiliary power unit 7. The flight control system 46 is used to obtain measurement of altitude, air speed and ambient temperature.

An environmental control system 48 is also connected to the electrical transmission 36. The environmental control system 48 may be one of multiple systems onboard the aircraft which may be powered by the turbine engines 4, 6 and the auxiliary power unit 7.

Figure 2:
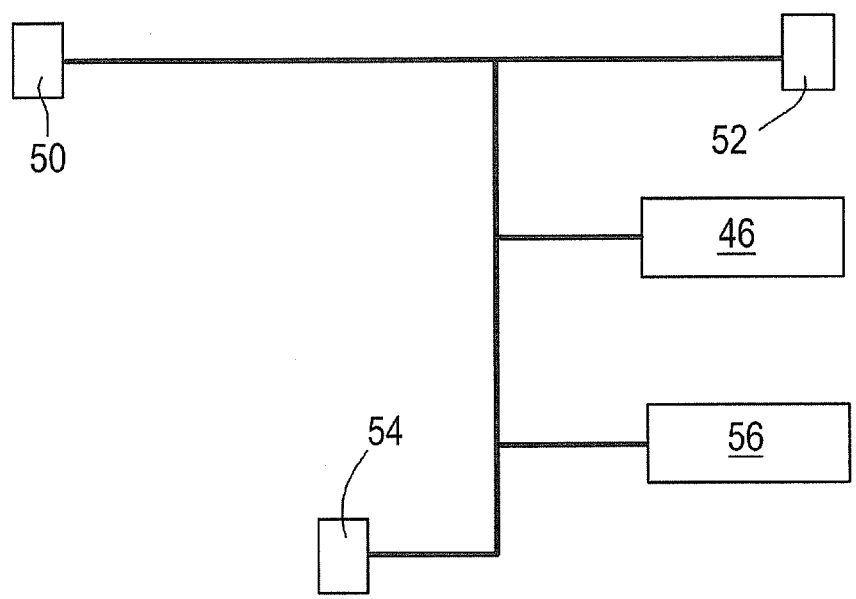
FIG. 2 is a schematic representation of the engines depicted in the propulsion system of an aircraft of FIG. 1.

Referring to FIG. 2, each engine 4, 6 comprises an engine controller 50, 52 for monitoring and controlling the speed of the core driveshaft 16, 18, and hence the compressor 8, 10, as well as operating the generator-motor 32, 34. The engine controller 50, 52 may also be used to monitor the operating temperature of the engine 4, 6 including the operating temperature of the compressor 8, 10 and output this to the flight control system 46.

The auxiliary power unit 7 comprises an auxiliary power unit controller 54 for controlling the power generated by the auxiliary power unit 7 as well as operating the generator-motor 44.

A secondary power management system 56 is provided for monitoring the electrical power requirements onboard the aircraft as well as the electrical power supplied by the first and second turbine engine 4, 6 and the auxiliary power unit 7. The secondary power management system 56 is capable of determining the amount of generating capacity onboard the aircraft in comparison with requirements.

The flight control system 46, engine controllers 50, 52, auxiliary power unit controller 54 and secondary power management system 56 are connected by a communication network, for example a network of wire cables.

During operation of the aircraft, the turbine engines 4, 6 generate thrust which propels the aircraft in flight. The engines 4, 6 are therefore the prime-movers of the aircraft. During ascent and cruise the normal operation of the engines 4, 6 ensures that the core compressors 8, 10 are at a sufficient temperature and rotational velocity at which ice accretion within the core compressors 8, 10 is inhibited. The flight control system 46 therefore determines that there is no risk of ice accretion so operates the generator-motors 32, 34, 44 in a generator mode in accordance with the electrical power requirements determined by the secondary power management system 56. The generator-motors 32, 34, 44 therefore generate electrical power which is fed via the electrical transmission 36 to power electrical systems onboard the aircraft, such as the flight control system 46 and the environmental control system 48.

In order to begin descent of the aircraft, the thrust produced by the turbine engines 4, 6 is reduced. The rotational velocity of each turbine engine 4, 6 is reduced to idle so that no, or minimal, thrust is produced by each turbine engine 4, 6. At idle, each core compressor 8, 10 has a nominal rotational speed which corresponds to the speed of the core compressor 8, 10 that the speed of the engine would normally dictate. The nominal rotational speed at idle is insufficient to prevent ice accretion within each core compressor 8, 10. Furthermore, the nominal temperature within the core compressors 8, 10 at idle is too low to prevent ice accretion within each core compressor 8, 10. The flight control system 46 therefore determines that there is a risk of ice accretion in the core compressors 8, 10.

In order to prevent ice accretion within the core compressor 8 of the first turbine engine 4, electrical power produced by the generator-motor 34 of the second turbine engine 6 is supplied via the electrical transmission 36 to the generator-motor 32 of the first turbine engine 4. The generator-motor 32 of the first turbine engine 4 is therefore operated in a motor mode to drive the driveshaft 16 and core compressor 8 of the first turbine engine 4 at an elevated rotational speed which is greater than the nominal speed of the core compressor 8 when the engine 4 is at idle. The second turbine engine 6 therefore donates electrical power to the first turbine engine 4. The elevated speed is greater than a speed at which the velocity of the air over the core compressor components is sufficient to inhibit ice accretion within the core compressor 8.

Because the first engine 4 is maintained at idle speed, the low-pressure turbine 28 and fan 20 do not increase in speed. The overall thrust produced by the first turbine engine 4 is therefore substantially the same as the normal thrust produced by the engine 4 at idle.

In order to donate the electrical power required to drive the core compressor 8 of the first turbine engine 4, the second turbine 6 must do a greater amount of work. The second turbine engine 6 is therefore operated at higher power, for example by supplying more fuel to the engine 6. This, in turn, increases the temperature of the second turbine engine 6 above the nominal temperature of the engine 6 which normal operation of the engine 6 at idle would dictate. The amount of power generated by the second turbine engine 6 is controlled so that the turbine engine 6, and hence compressor 10, operates at an elevated temperature at which ice accretion within the compressor 10 of the second turbine engine 6 is inhibited.

Thus, during descent of the aircraft, ice accretion within the core compressor 8 of the first turbine engine 4 is inhibited by driving the core compressor 8 at an elevated speed which is greater than the nominal speed of the core compressor 8 at idle, whereas ice accretion within the core compressor 10 of the second turbine engine 6 is inhibited by operating the core compressor 10 at an elevated temperature at which ice accretion is inhibited without increasing the speed of the engine 6. Consequently, ice accretion within the core compressors 8, 10 of both engines 4, 6 is inhibited without increasing the overall thrust produced by the engines 4, 6. This enables a steady rate of descent of the aircraft to be maintained. Furthermore, since both engines 4, 6 produce substantially the same amount of thrust, asymmetric thrust between the engines 4, 6 is avoided.

Effective inhibition of ice accretion as described above eliminates the need to strengthen components in order to withstand impact of shed ice.

During descent, fuel supply to the first engine 4 can be stopped to reduce fuel consumption while the elevated speed of the compressor 8 ensures that a rapid restart of the engine 4 is possible if required without having to further accelerate the core compressor 8. Although fuel consumption of the second turbine engine 6 increases when used to drive the compressor 10 of the first turbine engine 4, this is substantially offset by the reduction in fuel consumption of the first turbine engine 4 to which fuel supply has been interrupted.

In a second mode of operation, electrical power generated by the auxiliary power unit 7 is supplied via the electrical transmission 36 to the generator motors 32, 34 of the first and second turbine engines 4, 6 such that the generator-motors 32, 34 drive the respective core compressors 8, 10 of the first and second turbine engines 4, 6 at elevated rotational speeds which inhibit ice accretion in both compressors 8, 10.

In a third mode of operation, the first and second turbine engine 4, 6 are used to drive an electrical load, for example a secondary power system, while at idle speed so that both engines 4, 6, and hence both core compressors 8, 10, are operated at an elevated temperature which inhibits ice accretion in both compressors 8, 10. It will be appreciated that inhibition of ice accretion in a single engine could also be achieved with the single turbine engine being used to drive a load. The secondary power management system may, for example, determine that only one of the engines 4, 6 should be operated to generate all electrical power required onboard the aircraft so that that engine 4, 6 is operated at the elevated temperature.

In a further embodiment in which multiple engines are used to power a secondary power system, the number of engines used to drive the power system could be reduced so those engines which drive the power system must generate more power and so are operated at elevated temperatures thereby inhibiting ice accretion within the compressors of those engines. Examples include reducing the number of engines driving a secondary power source on a twin-engined aircraft to one engine, or reducing the number of engines driving a secondary power source on a four-engined aircraft to two engines.

It will be appreciated that the generator-motors 32, 34, 44 and the electrical transmission 36 could be replaced by a mechanical, hydraulic or other transmission which is suitable for transferring power between the engines 4, 6 and the auxiliary power unit 7.

Each generator-motor 32, 34, 44 may be a starter motor of a conventional gas turbine engines which is ordinarily used to start the engine.

The invention claimed is:

1. A method of inhibiting ice accretion within a turbine engine having a fan and a compressor wherein the fan provides a majority of thrust of the turbine engine, the method comprising the steps:

operating the fan at a predetermined rotational velocity; and driving the compressor of the turbine engine at an elevated rotational velocity which is greater than a nominal rotational velocity of the compressor at the predetermined rotational velocity of the fan so as to inhibit ice accretion within the compressor, wherein the predetermined rotational velocity of the fan is maintained when the compressor is driven at the elevated rotational velocity, and wherein the compressor of the turbine engine is driven at the elevated rotational velocity using power provided from a power supply external to the turbine engine.

2. A method as claimed in claim 1, wherein the predetermined rotational velocity of the fan is such that negligible thrust is generated by the turbine engine.

3. A method as claimed in claim 1, wherein the turbine engine is a receiving turbine engine and the power supply is a donating turbine engine.

4. A method as claimed in claim 3, wherein a fan of the donating turbine engine is operated at substantially the same predetermined rotational velocity as the fan of the receiving turbine engine while driving the compressor of the receiving turbine engine is driven at the elevated rotational velocity.

5. A method as claimed in claim 3, wherein the donating turbine engine is operated such that a compressor of the donating turbine engine is at an elevated temperature and ice accretion within the compressor of the receiving turbine engine is inhibited.

6. A method of inhibiting ice accretion within a turbine engine having a fan and a compressor wherein the fan provides a majority of thrust of the turbine engine, the method comprising the steps:

operating the fan at a predetermined rotational velocity; and driving the compressor of the turbine engine at an elevated rotational velocity which is greater than a nominal rotational velocity of the compressor at the predetermined fan rotational velocity of the fan so as to inhibit ice accretion within the compressor, wherein:

the compressor of the turbine engine is driven at the elevated rotational velocity by power generated by a power supply external to the turbine engine, the turbine engine is a receiving turbine engine and the power supply is a donating turbine engine, and the receiving turbine engine is mounted on an aircraft, wherein to begin a descent of the aircraft, an operating rotational velocity of the fan of the receiving turbine engine is reduced to the predetermined rotational velocity.

7. A method as claimed in claim 4, wherein the donating turbine engine is operated such that a compressor of the donating turbine engine is at an elevated temperature and ice accretion within the compressor of the receiving turbine engine is inhibited.

\* \* \* \* \*